United States Patent
Takahashi et al.

(10) Patent No.: US 6,906,771 B2
(45) Date of Patent: Jun. 14, 2005

(54) LIQUID CRYSTAL DISPLAY DEVICE

(75) Inventors: Hideyuki Takahashi, Saitama-ken (JP); Yasuyuki Hanazawa, Saitama-ken (JP); Kohei Nagayama, Saitama-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/335,897

(22) Filed: Jan. 3, 2003

(65) Prior Publication Data

US 2003/0151714 A1 Aug. 14, 2003

(30) Foreign Application Priority Data

Jan. 8, 2002 (JP) ........................................ 2002-001357

(51) Int. Cl.⁷ ............................................. G02F 1/1345
(52) U.S. Cl. ...................................... 349/152; 349/139
(58) Field of Search ................................ 349/139, 153, 349/149, 152

(56) References Cited

U.S. PATENT DOCUMENTS 5,311,342 A * 5/1994 Watanabe .................. 349/152
5,739,880 A * 4/1998 Suzuki et al. .............. 349/110

FOREIGN PATENT DOCUMENTS

JP        06148678 A  *  5/1994  ........... G02F/1/136

* cited by examiner

Primary Examiner—Kenneth Parker
(74) Attorney, Agent, or Firm—Oblon, Spivak, McClelland, Maier & Neustadt, P.C.

(57) ABSTRACT

A liquid crystal display device includes a driving voltage supply line connected to a transfer pad through a contact hole. The contact hole is corroded under the open air in a prior art liquid crystal display device. According to the present invention, however, the contact hole is provided in an air tight place ranging from an edge portion of a display area through a sealing material, e.g., underneath the sealing material. With this structure the contact hole is not exposed to the open air so that its resistance to corrosion is significantly improved.

6 Claims, 6 Drawing Sheets

US 6,906,771 B2

LIQUID CRYSTAL DISPLAY DEVICE

FIELD OF THE INVENTION

This invention generally relates to a liquid crystal display device and, in particular, to a liquid crystal display device with a transfer pad configured to supply driving voltages to an electrode of the display device through voltage supply lines.

BACKGROUND OF THE INVENTION

Active matrix type liquid crystal display devices with thin film transistors to write data on every pixel have been becoming mainstream for liquid crystal display devices. An ordinary active matrix type liquid crystal display device includes a circuit array substrate provided with a plurality of pixel electrodes regularly arranged in the display area, a counter substrate provided with a counter electrode opposite to the pixel electrodes, a liquid crystal layer held between the array and counter substrates, and a sealing material to seal the liquid crystal layer at the periphery of the substrates.

At the edge portion of the array substrate, a transfer pad is provided for supplying a driving voltage to the counter electrode as an electrode-connecting component. A transfer is also provided for electrically connecting the transfer pad to the counter electrode as an electrode transfer component. The driving voltage is supplied from an outside electric power source to the counter electrode through the transfer pad and the transfer.

A voltage supply line is disposed on the array substrate for supplying the driving voltage from the outside electric source to the transfer pad and is also connected to a contact hole formed on the transfer pad. According to a prior art liquid crystal display device, since the contact hole is arranged at the outside of sealing portions, it is exposed to the open air and easily corrodes away. As a result, the voltage supply lines become poor in electrical connection with the contact hole or a predetermined gap is defined between the transfer pad and an insulation layer formed underneath the transfer pad so that bubbles enter the liquid crystal layer and cause troubles such as deteriorations in electrical and/or optical characteristics and a poor picture display.

An object of the present invention is generally to provide a liquid crystal display device with the improvement of corrosion resistance with respect to a contact hole and with that of a good display quality.

SUMMARY OF THE INVENTION

The present invention is directed to a liquid crystal display device which includes a circuit array substrate, a counter substrate provided opposite to the array substrate, and a liquid crystal layer. A plurality of pixel electrodes are formed within a picture display area on the array substrate. A counter electrode is formed on the counter substrate to face the pixel electrodes. The array and counter substrates are put together at a predetermined distance by sealing them with a sealing material at the periphery of the picture display area. A line and an electrode-connecting component are formed on the array substrate to supply driving voltages to a counter electrode. The electrode-connecting component includes a contact hole to electrically contact the electrode-connecting component to the line. The electrode-connecting component and the counter electrode are electrically connected through an electrode transfer component. The contact hole is disposed on a place between the picture display area and the sealing material.

The contact hole is placed on, and overlapped with, the plane of the sealing material. At least one set of the electrode-contacting and electrode transfer components is provided for the liquid crystal display device. The electrode-connecting component is formed outside of the sealing material and is disposed in a space defined by additional organic components. A part of the organic components is made of the sealing material. The contact hole is preferably polygonal or half-oval in cross section. The electrode connecting component and the line to supply a driving voltage to the counter electrode are preferably made of indium-tin-oxide (ITO) and aluminum materials, respectively.

DETAILED DESCRIPTION OF THE INVENTION

Embodiments of a liquid crystal display device in accordance with the present invention are explained with reference to the attached drawings.

Figure 1:
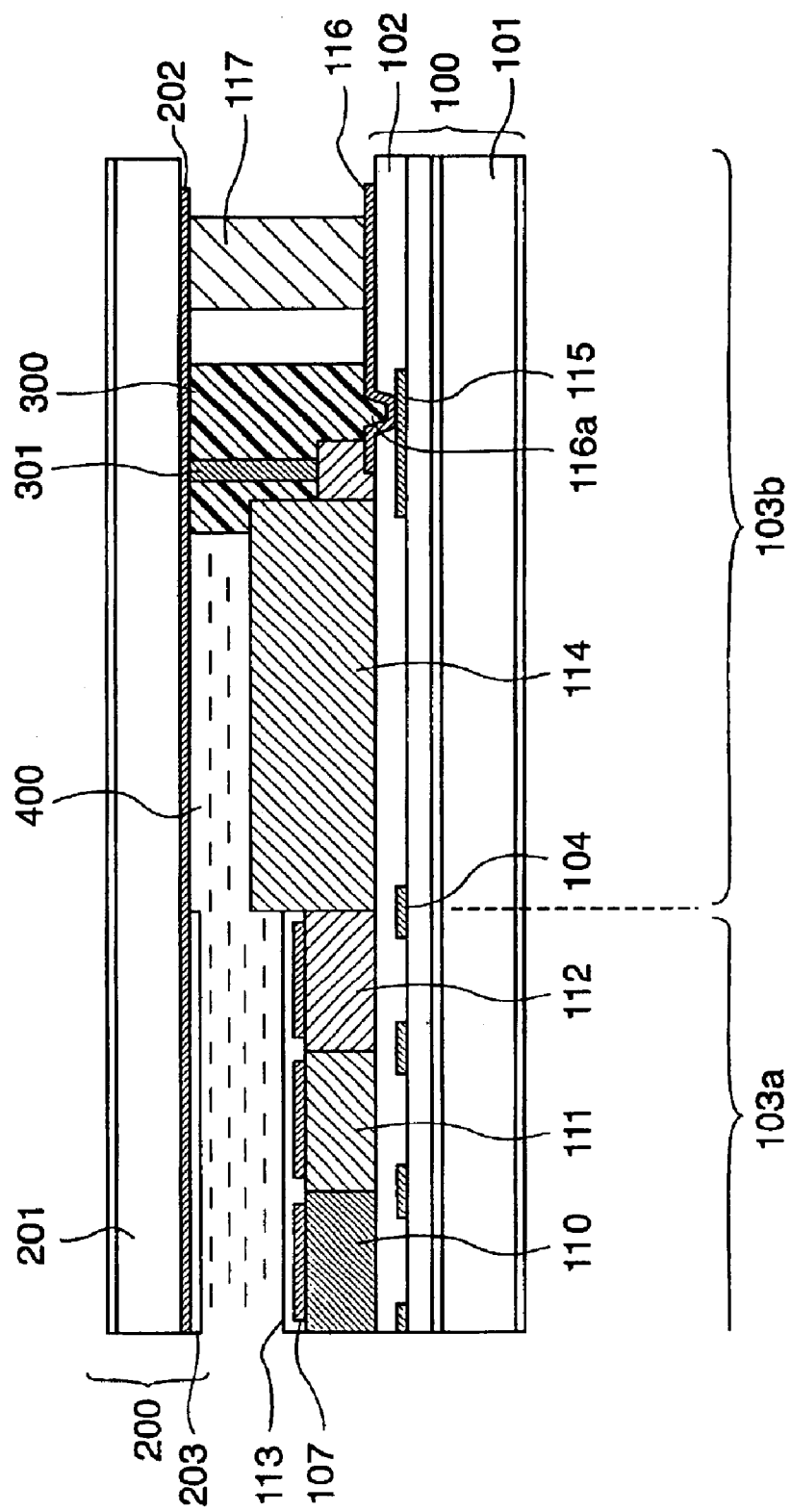
FIG. 1 is a schematic sectional view taken along line I–I' of the liquid crystal display device shown in FIG. 3.
Figure 2:
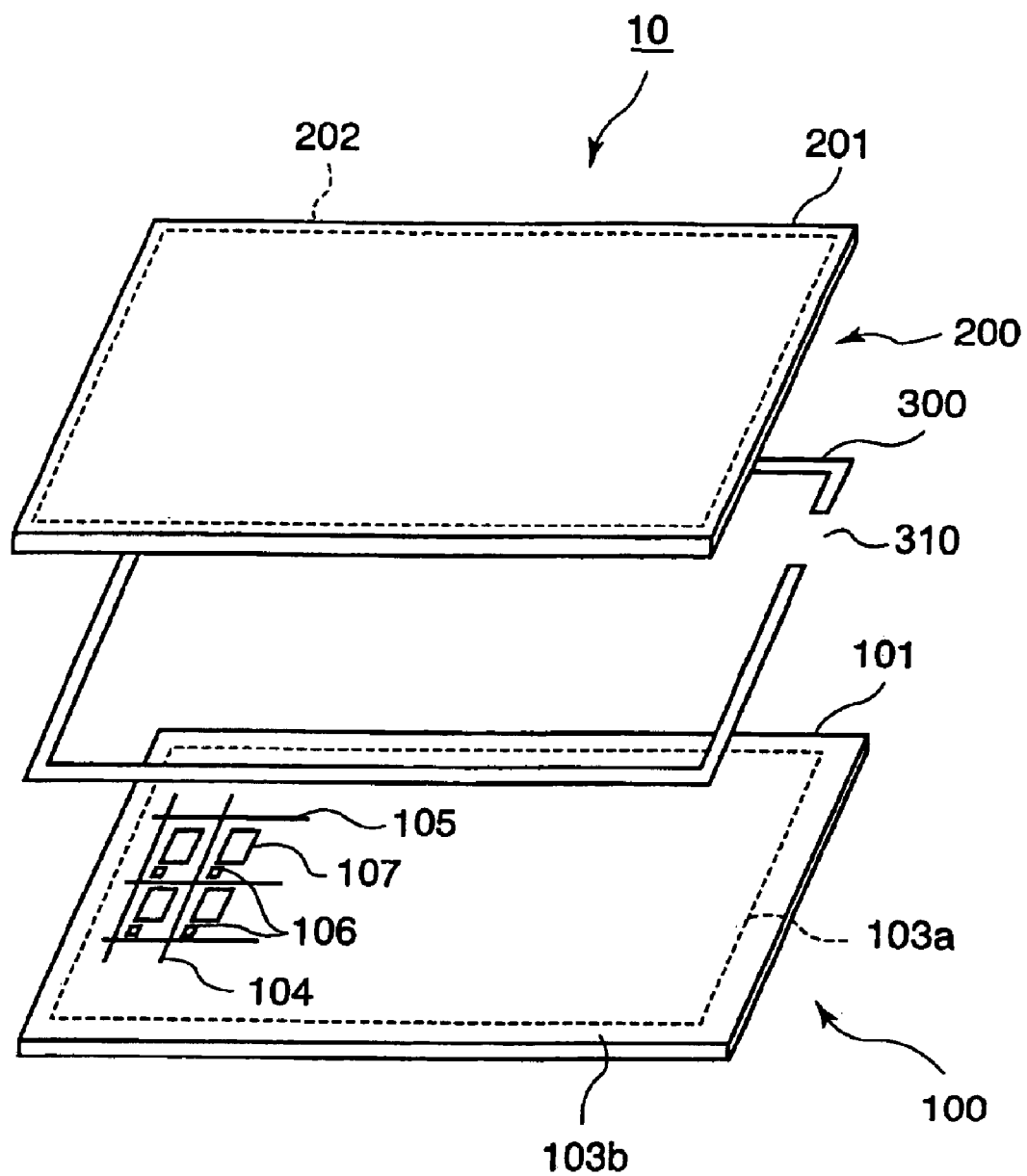
FIG. 2 is an exploded view of a liquid crystal display device.
Figure 3:
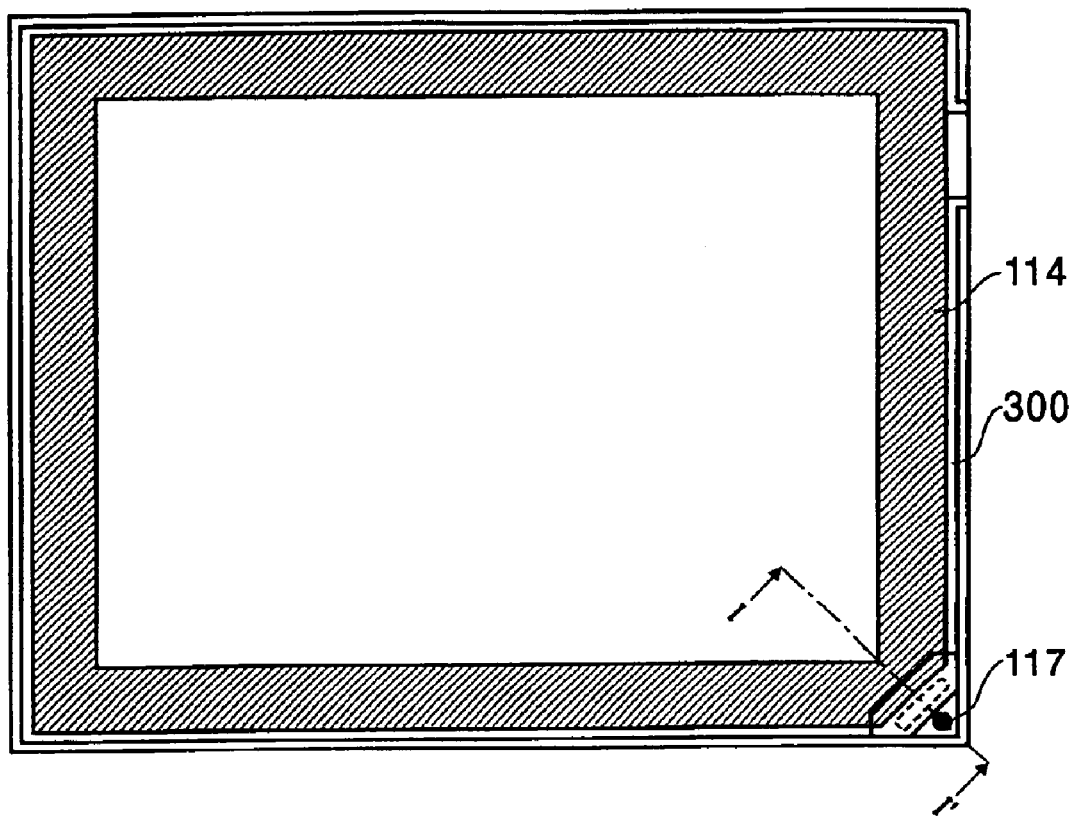
FIG. 3 is a schematic plan view of an embodiment of the liquid crystal display device shown in FIG. 2.

FIG. 2 is a schematic perspective view of separated components of a liquid crystal display device 10, FIG. 3 is a schematic plan view of the liquid crystal display device shown in FIG. 2 and FIG. 1 is a schematic sectional view along the I–I' line of the liquid crystal display device shown in FIG. 3. Only major components are described in the attached drawings. Thus, the other peripheral ones are not shown for simplicity and explanations thereof are omitted. Now, descriptions will be made below with reference to FIGS. 1 through 3.

The liquid crystal display device 10 includes circuit array and counter substrates 100 and 200, a sealing material 300 and a liquid crystal layer 400 held in a space defined by the substrates 100 and 200 and the sealing material 300.

The array substrate is provided with a transparent glass substrate 101 and its plane is divided into two areas, i.e., a display area 103a and a frame area 103b. A plurality of signal lines 104 and a plurality of scanning lines 105 are disposed on the display area 103a in a matrix form with an isolation layer 102 interposed between signal and scanning lines 104 and 105. A thin film transistor (TFT) 106 as a switching element and a pixel electrode 107 are provided to connect each other at each grid (cross point) of the matrix form. Green, blue and red color filters 110, 111 and 112 made of organic resins are disposed in predetermined stripe patterns on the upper surface of isolation layer 102. The pixel electrode 107 is formed on the color layers 110, 111 and 112 and an alignment layer 113 is provided to cover the pixel electrode 107.

A black stripe 114 is formed at the frame area 103b of the array substrate 100 to cut off incident light. The same layer as the signal line 104 includes driving circuits for signal and scanning lines, not shown, to supply video signals to the pixel electrode 107 and a plurality of driving lines connected to the driving circuits. A line 115 shown in FIG. 1 as one of the driving lines is provided to supply a counter voltage. The line 115 is made of aluminum in this embodiment.

A transfer pad 116 and a transfer 117 are disposed at the corner of the frame area 103b for supplying a counter voltage to a counter electrode 202 and for electrically connecting the transfer pad 116 to the counter electrode 202, respectively. A contact hole 116a is made in the isolation layer 102. An extended portion of the transfer pad 116 is provided in the contact hole 116a to electrically connect the pad 116 to the line 115. The transfer pad 116 in the embodiment is made of indium-tin-oxide (ITO). The contact hole 116a and the transfer pad 116 receive the sealing material 300 made of organic materials. The sectional configuration of the contact hole 116a is not limited to a part of an oval as shown in the embodiment but may be that of a polygon.

The counter substrate 200 is made of a transparent glass substrate 201 as the array substrate 100 is. The counter electrode 202 is formed on the inner surface of the counter substrate 200 and is covered on its inner surface with an alignment layer 203.

The array and counter substrates 100 and 200 are provided opposite to each other to define a cell with a predetermined gap held by a spacer column 301. The sealing material 300 surrounding the panel periphery binds the array and counter substrates 100 and 200 together. After the substrates 100 and 200 have been bound by the sealing material, a liquid crystal material is injected into the cell from an inlet 310 defined between both edges of the sealing material 300 and a liquid crystal layer 400 is made.

In the liquid crystal display device 10, a counter voltage supplied from the outside power source is provided to the counter electrode 202 through the line 115, the contact hole 116a, the transfer pad 116 and the transfer 117. Since the contact hole 116a is covered with the sealing material 300, its surface is not exposed to the atmosphere (open air) so that its resistance to corrosion is significantly improved. Thus, the line 115 and the extended portion of transfer pad 116 provided in the contact hole 116a always maintain good electrical connection and no gap takes place between the transfer pad 116 and the isolation layer 102 thereby preventing bubbles from entering into the liquid crystal layer 400. As a result, the liquid crystal display device according to the present invention brings about no substantial deterioration in electrical and optical characteristics but obtains a good display quality for a relatively long period of time.

Figure 4:
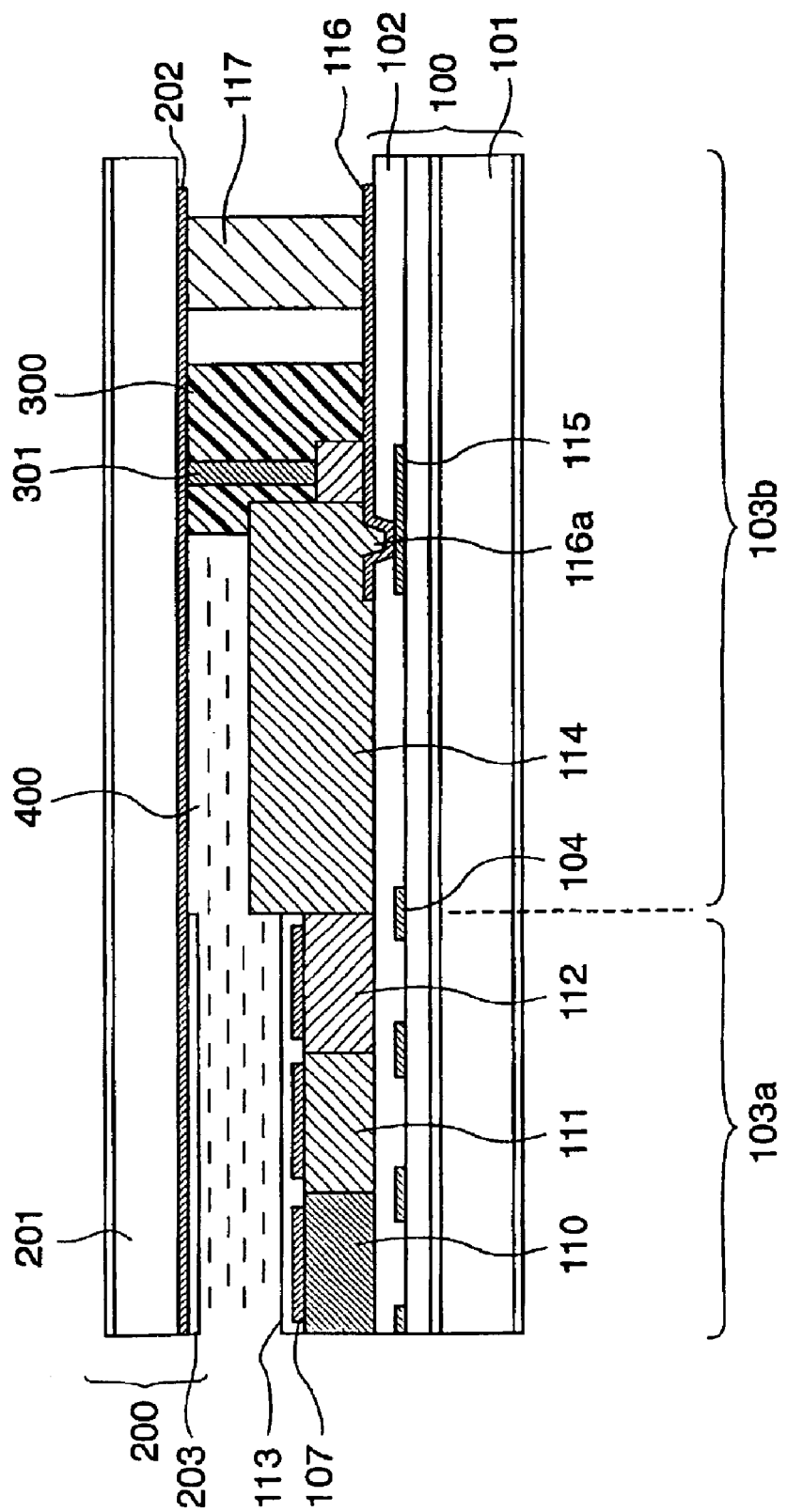
FIG. 4 is a schematic sectional view of a liquid crystal display device which is a second embodiment of the present invention.

Although the contact hole 116a is disposed at such a place that the sealing material is overlapped with in the embodiment, it may be provided at any place in the isolation layer 102 ranging from the edge portion of the display area 103a through the sealing material 300. For instance, the contact hole 116a is disposed underneath the black stripe 114 as shown in FIG. 4. In this case, the surface of the contact hole 116a is not exposed to the atmosphere, either, so that its resistance to corrosion is remarkably improved.

Figure 5:
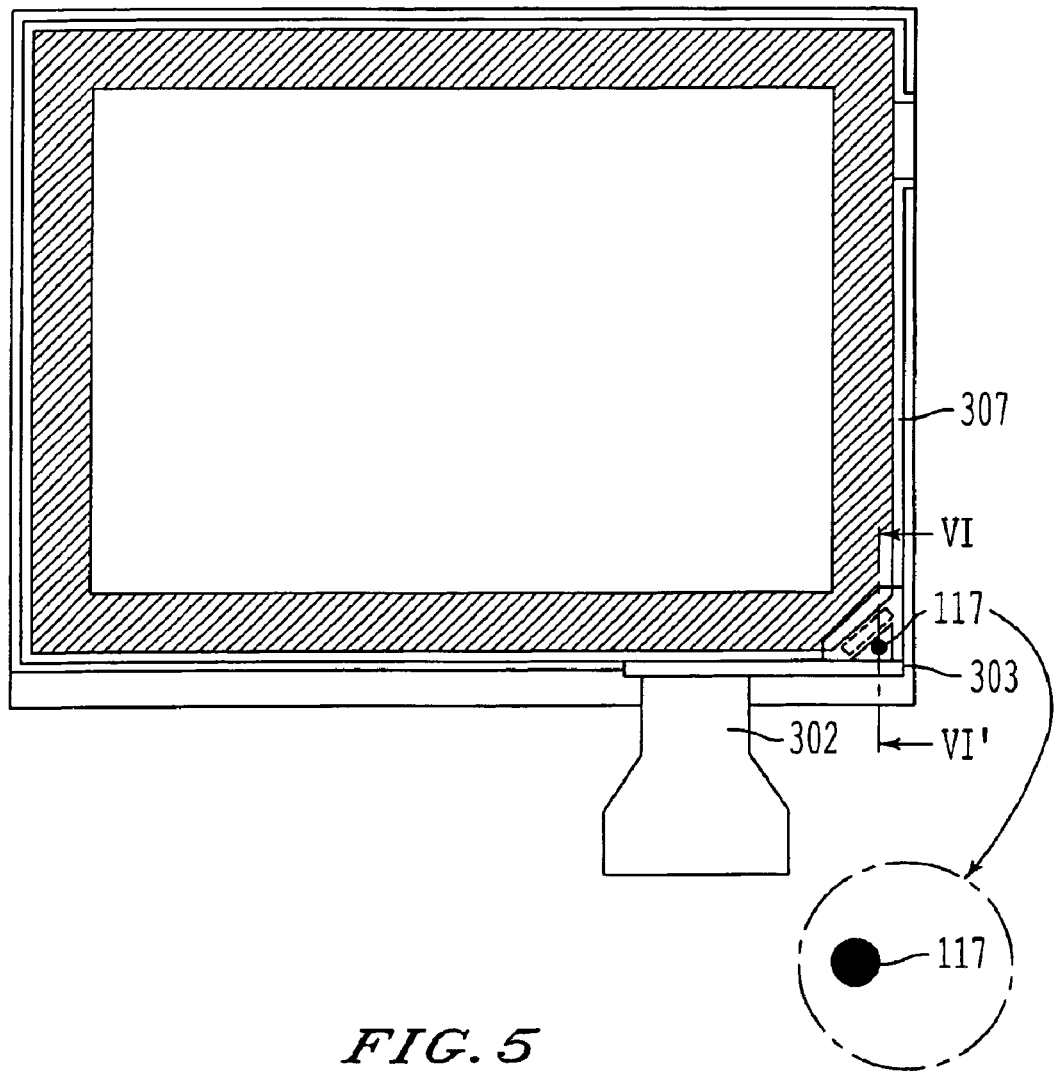
FIG. 5 is a schematic plan view of a liquid crystal display device which is a third embodiment of the invention.
Figure 6:
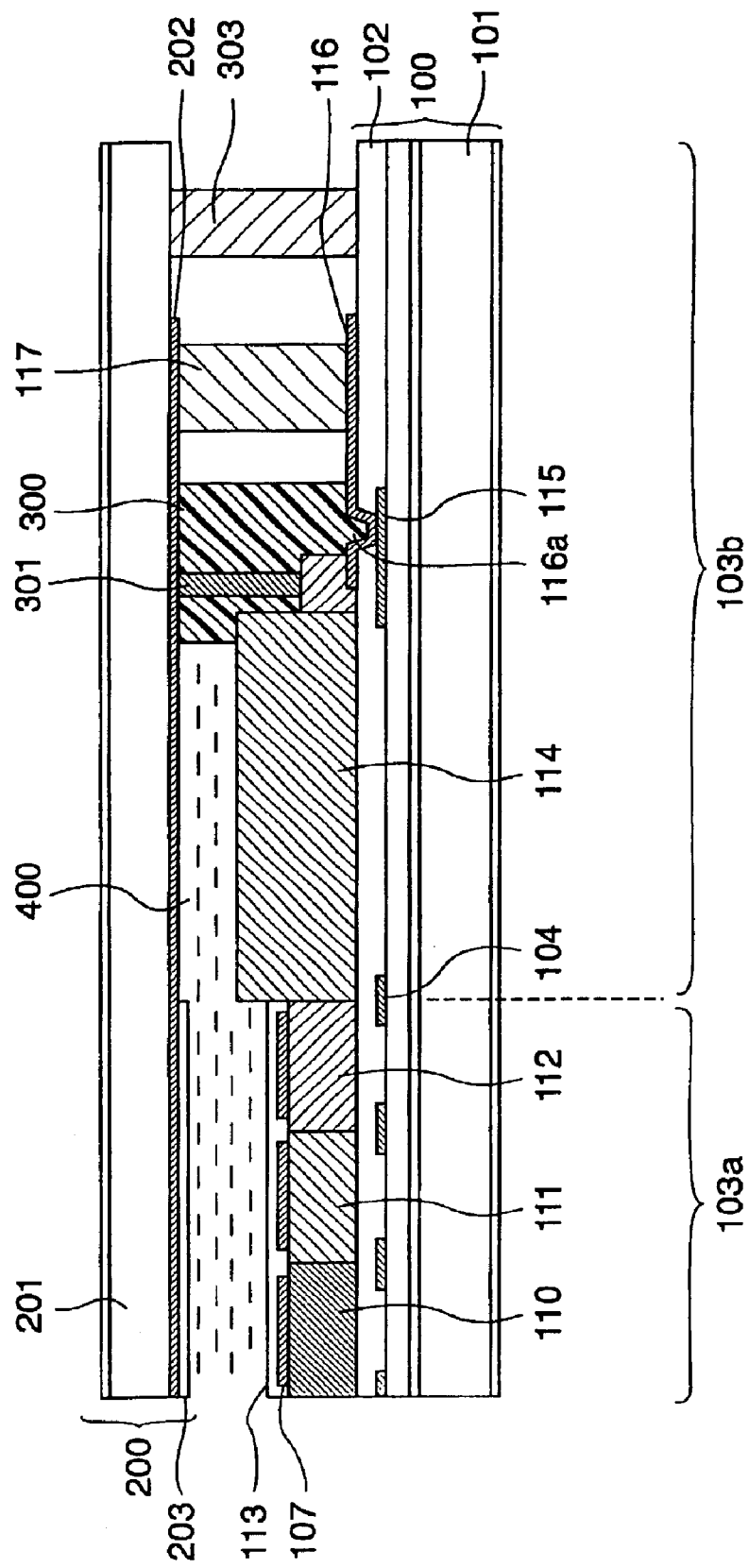
FIG. 6 is a sectional view taken along line VI–VI' of the liquid crystal display device shown in FIG. 5.

FIGS. 5 and 6 show a third embodiment of the present invention. FIG. 5 shows a schematic plan view of a liquid crystal display device. FIG. 6 is a sectional view taken along line VI-VI' of the liquid crystal display device shown in FIG. 5.

The liquid crystal display device includes a sealing material 300 surrounding a transfer pad 116 and a sealing member 303 of a component (e.g., an outer-lead bonding portion) of a flexible printed circuit board 302. The flexible printed circuit board 302 is electrically connected to the driving lines on the array substrate 100. Both sealing material 300 and sealing member 303 extend to define an airtight space to enclose the transfer pad 116. With that structure, the contact hole 116a can be fixed within such an airtight space even if a fixed place of the contact hole 116a shifts to the outside of the sealing material 300. Thus, the surface of the contact hole 116a is not exposed to the open air. As a result, its resistance to corrosion is improved as in the previous embodiments. Although both of the sealing material 300 and the sealing member 303 of the flexible printed circuit board 302 extend to define the airtight space in this embodiment, the air-tight space may be also defined by the sealing material 300, only, or by other organic materials.

A pair of the transfer pad 116 and the transfer 117 are shown as an example but two pairs of them or more may be also provided to achieve the same function and effect.

The present invention is applicable not specifically to a liquid crystal display device but also generally to other flat panel display devices with the same or similar electrode structure. Thus, a liquid crystal display device means itself and may also mean its equivalents as well.

According to the present invention, a contact hole to connect one component to the other is not exposed to the open air so that its resistance to corrosion can be greatly improved. Thus, a driving voltage supply line and the contact hole always maintain good electrical connection and a transfer pad and an isolation layer define no gap to prevent bubbles from entering into a liquid crystal layer in the case of a liquid crystal display device. As a result, a flat panel display device of the present invention does not cause poor electrical and optical characteristics but a good display quality for a long period of time.

What is claimed is:

1. A liquid crystal display device comprising:
   a circuit array substrate including a plurality of pixel electrodes in a display area of said array substrate and an isolation layer;
   a counter substrate including a counter electrode provided opposite to said pixel electrodes;
   a sealing material provided at a periphery of said display area to bind said array and counter substrates together with a predetermined gap;
   a liquid crystal layer filled in a space defined by said array and counter substrates and said sealing material;
   a line formed on said array substrate to supply a counter voltage to said counter electrode;
   a connecting component formed on a contact hole defined in said isolation layer, said connecting component having an extended portion extending beyond an outer circumference of said sealing material; and
   a transfer component configured to electrically connect said counter electrode to said connecting component,
   wherein said contact hole is provided between an edge portion of said display area and said outer circumference of said sealing material, and
   said transfer component is connected to said extended portion of said connecting component beyond the outer circumference of said sealing material.

2. The liquid crystal display device according to claim 1, wherein at least a pair of said line and said transfer component are provided.

3. The liquid crystal display device according to claims 1, further comprising:

organic materials configured to define an airtight space with said sealing material, wherein said transfer component is provided in said space.

4. The liquid crystal display device according to claim 3, wherein said organic materials abut said sealing material.

5. The liquid crystal display device according to claim 2, further comprising:

organic materials configured to define an airtight space with said sealing material, wherein said transfer component is provided in said space.

6. The liquid crystal display device according to claim 5, wherein said organic materials abut said sealing material.

* * * * *